Patented June 17, 1924.

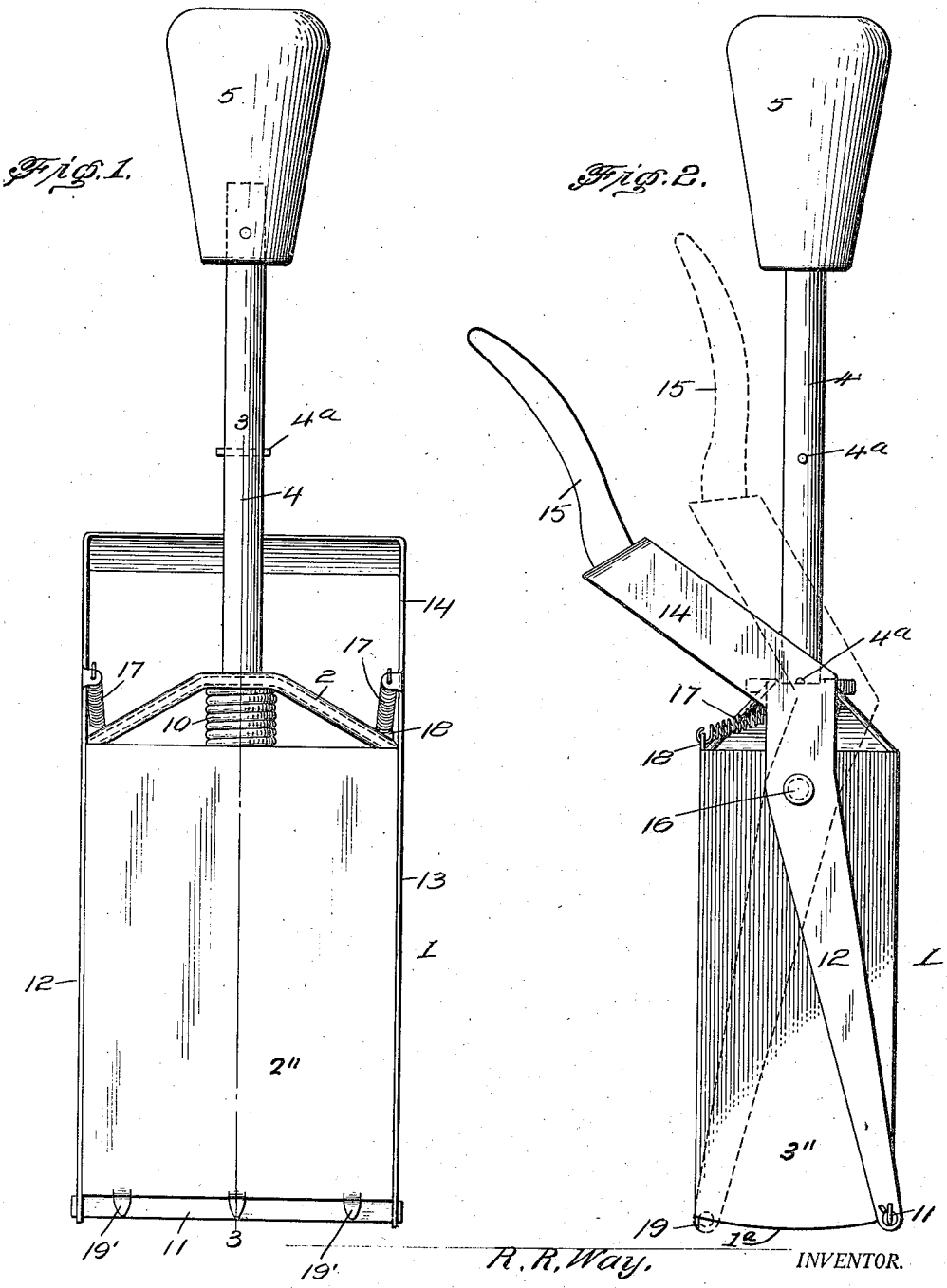

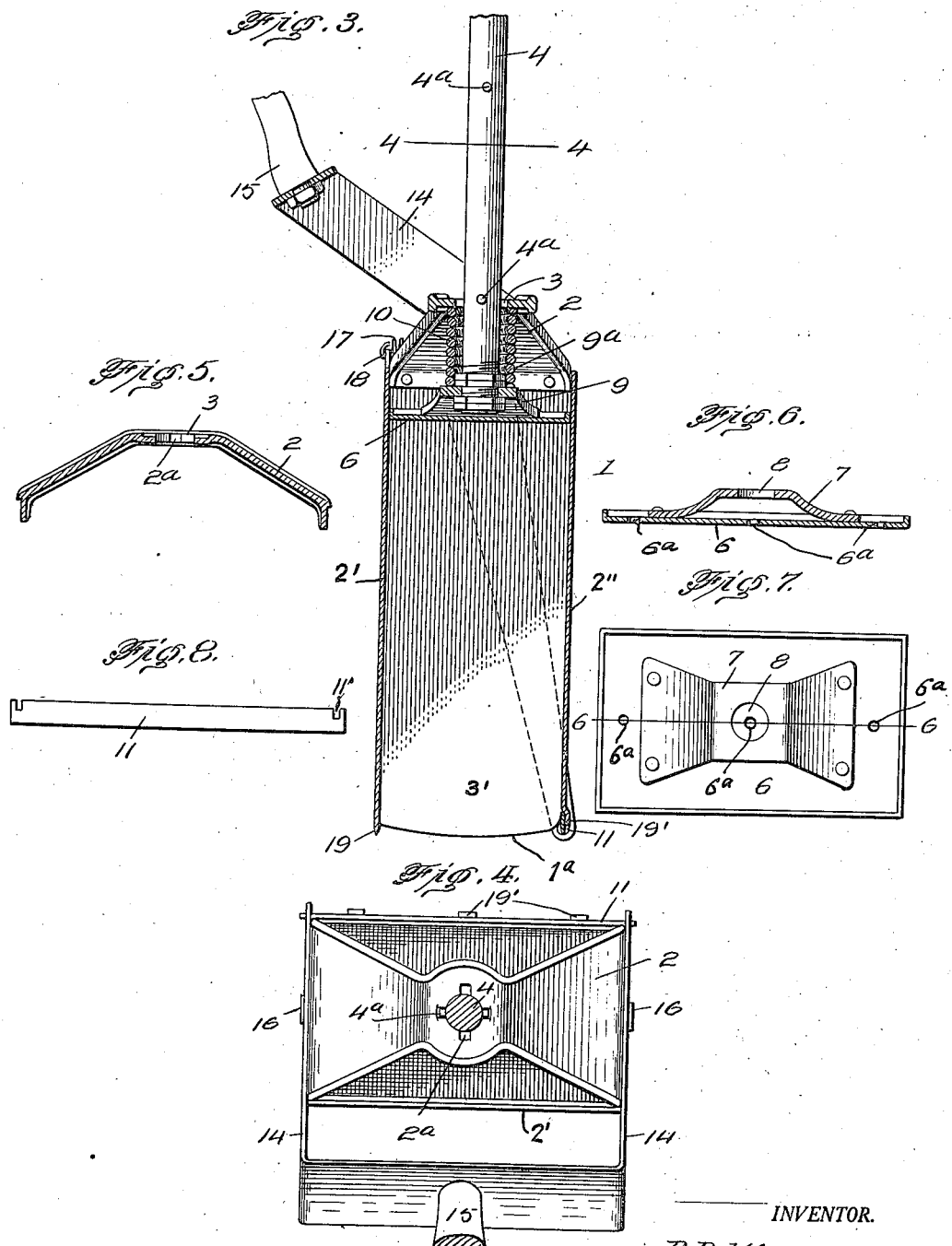

1,498,497

UNITED STATES PATENT OFFICE.

ROBERT R. WAY, OF DETROIT, MICHIGAN.

ICE-CREAM MEASURING AND DISPENSING DEVICE.

Application filed October 10, 1921. Serial No. 506,603.

*To all whom it may concern:*

Be it known that I, ROBERT R. WAY, a citizen of the United States, residing at Detroit, in the county of Wayne and State of Michigan, have invented certain new and useful Improvements in Ice-Cream Measuring and Dispensing Devices, of which the following is a specification.

This invention relates to measuring apparatus and more particularly to ice cream measuring and dispensing devices.

The object of the invention is to provide a simple and efficient device of this character so constructed that a predetermined quantity of ice cream may be accurately measured and dispensed.

Another object of the invention is to provide a dispensing device including a measuring scoop or container and a piston operable therein which is adjustable to vary the capacity of the scoop and also capable of being utilized for expelling the contents of the scoop.

Another object is to produce a device of this character having a cutter adapted to be used for separating the ice cream to be dispensed from that in the vessel in which it is stored.

With these and other objects in view, the invention consists in certain novel features of construction as hereinafter shown, described and claimed.

In the accompanying drawings:—

Figure 1 represents a front elevation of a measuring device constructed in accordance with this invention.

Fig. 2 is a side elevation thereof, with a cutter carrying arm shown in normal position ready for use in full line and in the position assumed after the cream has been cut in dotted lines.

Fig. 3 is a longitudinal section taken on the line 3—3 of Fig. 1.

Fig. 4 is a transverse section taken on the line 4—4 of Fig. 3.

Fig. 5 is a detail longitudinal section of the top or cover member at the inner end of the container.

Fig. 6 is a longitudinal section taken on the line 6—6 of Fig. 7.

Fig. 7 is a top plan view of the piston or plunger, and

Fig. 8 is a side elevation of the cutter.

In the embodiment illustrated, a substantially elongated container is shown of any desired cross sectional contour, being here shown rectangular. The container is referred to generally by the reference character 1 and the upper or rear end of which is closed by a hollow tapering closure 2, here shown riveted to the rear or upper end of the container but obviously it may be secured thereto in any other suitable or desired manner. The side walls of the container are indicated at 2′, 2″ and the end walls at 3′, 3″. See Figures 3 and 4. The inner termini of the end walls are curved, as at 1ª, see Figure 3, and such curvature is segmental in contour. Sweeping across the curved termini of the end walls is a flat cutter, to be hereinafter referred to. One of the inner corners of each end wall is rounded to provide for the cutter, to be hereinafter referred to, when moved to normal position to lie erect and in line with the side wall 2″. The side wall 2″ is of less length than the side wall 2′ whereby the inner terminus of the side wall 2″ will be positioned forwardly with respect to the inner terminus of the side wall 2′. The top of the closure 2 is square and has an opening 3 therein for the passage of the plunger rod 5, which carries at its inner end a piston or plunger head 6, shaped to conform to the cross sectional contour of the container 1, and to fit snugly therein and adapted to be reciprocated in said container by means presently to be described. The plunger head 6, has mounted on its rear face a combined reinforcing and coupling member 7, which is of inverted V-shape and is formed from a plate including an inner and a pair of outer portions. The inner portion is square and each outer portion gradually increases in width from its inner to its outer terminus and further each outer portion is inclined downwardly with respect to the inner portion. By setting up the member 7 in the manner as stated the inner portion thereof is offset with respect to the plunger head. The inner portion of the member 7 is formed with a centrally disposed opening 8 for the passage of the plunger rod 4. The offsetting of the inner portion of the member 7, enables the positioning of fastening nuts 9 on the inner end of the plunger rod 4 and with one of said nuts abutting against the inner face of the inner portion of the member 7. Secured to the plunger rod 4 is a pair of fastening nuts 9ª and one of said nuts abuts against the outer face of the inner portion of the member 7. The inner terminal portion of the plunger rod 4 is peripherally threaded for the reception of the nuts 9, 9ª.

A heavy coiled spring 10 is arranged on the plunger rod 4, between the member 7 and the inner face of the top 2, as is shown clearly in Fig. 3, and is designed to exert its tension to project the plunger 6, when the ice cream is to be expelled from the container.

The plunger rod 4, is provided with a plurality of longitudinally spaced laterally projecting pins or studs 4ª, which are designed to pass through notches 2ª, formed in the walls of the aperture 3 of the top 2, shown clearly in Fig. 4. Two of the said pins 4ª, are arranged diametrically opposite each other in the same plane, so that they may pass through the diametrically opposite notches 2ª, when the rod 4 is retracted and when the rod is turned they will rest on the upper face of the top 2, and hold the plunger head 6, in adjusted position against the tension of the spring 10. While two pairs only of these studs 4ª, are shown, obviously any desired number may be employed so that the position of the plunger head 6, within the container 1, may be varied to regulate the size of the container 1, in advance of said plunger which portion of the container is designed to receive the ice cream to be measured and dispensed.

The plunger rod 4, is provided at its outer end with a suitable handle 5, for manipulating it.

A cutter 11, is carried by a pair of cutter arms 12 and 13, fulcrumed midway their ends to opposite sides of the scoop or container 1, and which are connected at their rear ends by a substantially bail-shaped offset handle member 14, from which projects rearwardly a hand grip 15, for manipulating the cutter. This cutter 11, is formed from a flat bar and of a length sufficient to span the outer or open end of the container 1, from one side to the other thereof as is shown clearly in Fig. 1 and is designed to be moved from one wall to the other of the scoop by pressure exerted on the hand grip 15. The cutter arms 12 and 13 have openings in the inner termini thereof into which extend the ends of the cutter 11, and the said openings are of substantial size, and the connection between the ends of the cutter 11 and the cutter arms is such as to provide that when the cutter sweeps across the edges 1ª it lies flat and provides what may be termed a shear cut, and when the cutter 11 is moved to its normal or inoperative position it lies erect and in line with the side wall 2″. The rounded inner corners of the end walls permit of the cutter 11 to assume an erect position when the cutter is moved to normal or inoperative position.

The cutter bar 11 consists of a flat rectangular strip of substantial width having its edges constituting respectively a cutting edge and a follower edge and with the follower edge at a point in proximity to each end of the blade notched, as at 11′. The cutter arm 12, as well as the cutter arm 13, has the lower terminus thereof provided with a circular opening 12′, and through the openings 12′ project the end terminal portions of the cutter 11. The walls of the openings 12′ extend into the notches 11′, and by this arrangement the cutter bar 11 is pivotally and loosely connected to the cutter arms. The connection between the cutter 11 and the arms 12, 13, enables the sweeping of the cutter bar flat-wise over the inner terminus of the end walls of the container to provide a shear cut, and further permits of the cutter bar lying erect when in normal position and opposing the rounded corners of each of the end walls. One of the fulcrums for the cutter arms 12 and 13, is shown at 16, in Fig. 2, and is shown located adjacent the rear or upper end of the container, said fulcrums preferably having flanged heads or other means to prevent the arms 12 and 13, from spreading and coming off. Coiled springs 17, connect the cutter arms at the rear of their fulcrums 16 with the rear end of the container as shown at 18, and operate to hold the cutter in the position shown in full lines in Fig. 2, ready for use and to return it to such position, after it has been actuated for cutting the cream to separate that contained in the scoop from that in the vessel in which it is stored.

Formed integral with the outer face of the side wall 2′ of the container, is a plurality of spaced stops which project from the inner terminus of said wall, and each of said stops is in the form of a finger 19 and such stops are employed for limiting the cutting movement of the cutter. The side wall 2″ has its inner terminal portion formed with a pair of spaced offset extensions 19′, which are employed for limiting the return movement of the cutter to normal position. The extensions 19′ project beyond the inner terminus of the side walls 2″.

The fingers 19, as well as the extensions 19′ are pointed, and these latter are arranged forwardly with respect to the fingers 19.

In the use of this device the piston or plunger head 6, is adjusted by means of the handle 4, to the desired position within the scoop, the capacity of the scoop being thereby varied to receive a predetermined quantity of cream. The plunger head 6, is retained in position against the tension of the spring 10, by engaging the studs 4ª, with the outer or rear face of the member 2. The scoop is then pressed into the body of the cream which will fill that portion beyond the piston or plunger head 6. The hand-grip 15, is then grasped and moved toward the plunger rod 4, which operates to move the cutter 11, across the open end of the scoop 1, to separate the cream within the scoop from the body of the cream outside the scoop, the cutter turning and following the edge of the scoop. The scoop containing the cream is now withdrawn and the hand grip 15, is released, the spring 17, operating to return the cutter 11, to normal position as shown in full lines in Fig. 2. The plunger head is then released by giving a partial turn to the handle 5, sufficient to bring the studs 4ª, into register with a pair of the diametrically opposite notches 2ª, and under the tension of spring 10, said plunger head is projected thereby expelling the contents of the scoop. The plunger head 6, is then retracted by pulling outwardly on the handle 5, until it has reached the desired position within the scoop, when it is held in such position by engaging a pair of the studs 4ª, with the outer face of the closure, 2 and the scoop is again ready for use.

The plunger head 6 is equipped with apertures 6ª, to prevent the formation of an air cushion between the plunger head and the cream forced into the container.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:

A device for the purpose set forth comprising a rectangular container having an open inner end, the inner terminus of each of the end walls of said container being segmental in contour and each of said end walls having one of the inner corners thereof rounded, said rounded corners opposing each other, a flat cutter bar including a cutting edge and a follower edge, said follower edge being notched in proximity to each end of the cutter bar, and a pair of spring controlled cutter arms pivotally connected to the side walls of said container, each of said cutter arms having its inner end provided with an opening, said cutter bar having its ends extending through said openings, said arms seated in said notches, and said notches and openings constituting means for pivotally and loosely connecting the cutter bar to said arms thereby providing for the flat-wise sweeping on the operation of the cutter bar against the inner terminus of said end walls to form a shear cut and further for the cutter bar lying erect and opposing said rounded corners when inactive.

In testimony whereof, I affix my signature hereto.

ROBERT R. WAY.